(12) United States Patent
Wang et al.

(10) Patent No.: US 11,859,970 B2
(45) Date of Patent: Jan. 2, 2024

(54) BIASING DEVICE FOR DETECTING A CONDUCTOR POSITION AND WIRE PROCESSING EQUIPMENT

(71) Applicant: TYCO ELECTRONICS (SHANGHAI) CO., LTD., Shanghai (CN)

(72) Inventors: Zhen Wang, Shanghai (CN); Yiqun (Cham) Zhu, Shanghai (CN)

(73) Assignee: TYCO ELECTRONICS (SHANGHAI) CO., LTD., Shanghai (CN)

(*) Notice: Subject to any disclaimer, the term of this patent is extended or adjusted under 35 U.S.C. 154(b) by 229 days.

(21) Appl. No.: 17/530,606

(22) Filed: Nov. 19, 2021

(65) Prior Publication Data

US 2022/0163312 A1  May 26, 2022

(30) Foreign Application Priority Data

Nov. 24, 2020 (CN) .......................... 202011334432.8

(51) Int. Cl.
  *G01B 7/00* (2006.01)
  *H01R 43/02* (2006.01)
  *H02G 1/00* (2006.01)

(52) U.S. Cl.
  CPC .................................... *G01B 7/003* (2013.01)

(58) Field of Classification Search
  None
  See application file for complete search history.

(56) References Cited

U.S. PATENT DOCUMENTS

2016/0260528 A1* 9/2016 Widaj ..................... H01B 13/06
2021/0405127 A1* 12/2021 Wang ........................ H02G 1/00

* cited by examiner

*Primary Examiner* — Jermele M Hollington
*Assistant Examiner* — Suresh K Rajaputra
(74) *Attorney, Agent, or Firm* — Potomac Law Group, PLLC

(57) ABSTRACT

The present application provides a biasing device for detecting a conductor position and wire processing equipment. The biasing device has a bracket, a first drive mechanism, and a detection mechanism. The first drive mechanism has a first support shaft and a mounting slide block rotatably arranged on the bracket, and a mounting slide block, the mounting block can move relative to the bracket along the extension direction of the first support shaft when the first support shaft rotates; the detection mechanism is fixedly connected to the mounting slide block, and is arranged movably relative to the bracket along the extension direction of the first support shaft to determine whether the measured conductor is located in the detection area of the designated position. The biasing device provided by the present application compensates for the offset of the heat shrinkable tube by adversely adjusting the position of the detection mechanism in advance, thereby ensuring that the heat shrinkable tube is accurately wrapped on the exposed conductor surface at the designated position of the wire in the subsequent process and increasing the scope of application.

20 Claims, 3 Drawing Sheets

BIASING DEVICE FOR DETECTING A CONDUCTOR POSITION AND WIRE PROCESSING EQUIPMENT

TECHNICAL FIELD

The application relates generally to wire processing, and more specifically, to a biasing device for detecting a conductor position and a wire processing equipment.

BACKGROUND OF INVENTION

When splicing two bundles of wires, it is required to cut off a section of the insulation of the two bundles of wires, and expose part of the conductors respectively, and connect the exposed parts of the two wires by welding, and then wrap a section of insulation heat shrinkable on the exposed conductors casing. In the process of automated processing, it is necessary to fix the two wires and make the exposed conductors in the designated position, so as to wrap the insulating heat-shrinkable tube on the surface of the exposed conductor. In the existing technology, the position of the probe is manually adjusted in advance before production, and the bare conductors that have been soldered are sent to the detection device for detection to determine whether the wire is in the designated position. However, the position of the detection mechanism cannot be adjusted during the production process. When the cross-sectional area is different, the heat-shrinkable tube will be offset, resulting in the risk of the insulating heat-shrinkable tube not being able to accurately wrap the exposed conductor surface of the wire, and the scope of application is limited.

SUMMARY OF INVENTION

The purpose of the present application is to provide a biasing device for detecting a conductor position and wire processing equipment to solve the problem that the detection device in the prior art cannot adjust the position of the detection mechanism during the production process. When the cross-sectional area of the two ends of the conductor is different, the heat-shrinkable tube will be offset, resulting in the risk of the heat-shrinkable tube not being able to accurately wrap the exposed conductor surface of the wire, which is a technical problem with limited application scope.

In order to achieve the above objective, the technical solution adopted by the present application is to provide a conductor position detection device that could be biased, including:

a bracket;
a first drive mechanism, the first drive mechanism comprises a first support shaft rotatably arranged on the bracket and a mounting slide block arranged on the first support shaft, the mounting slide block can be arranged on the first support shaft and moves relative to the bracket along the extending direction of the first support shaft when the first support shaft rotates; and
a detection mechanism, the detection mechanism is fixedly connected to the mounting slide block, and is movably arranged relative to the bracket along the extension direction of the first support shaft to determine whether the measured conductor is located in the detection area of a designated position.

In one embodiment, the first support shaft comprises a threaded portion and a smooth portion fixedly connected to the threaded portion, and the mounting slide block is connected to the threaded portions are connected by threads.

In one embodiment, the first drive mechanism further comprises a support slider, and the support slider is slidably arranged on the smooth portion.

In an embodiment, a first knob is fixedly provided on the first support shaft for driving the first support shaft to rotate relative to the bracket.

In one embodiment, the detection mechanism further comprises a swing frame and a first measuring assembly, and the first measuring assembly comprises a first fixing frame fixedly connected to the swing frame and an offset measurement indicator arranged on the first fixing frame, the offset measurement indicator is fixed to a reference mark fixed on the bracket by matching for measuring the offset of the detection mechanism.

In one embodiment, the detection mechanism comprises a swing frame and a second drive mechanism, and the swing frame is fixedly connected to the mounting slide block, the second drive mechanism comprises a hollow drive rod sleeved on one end of the first support shaft and rotatably arranged on the bracket, a second support shaft rotatably arranged on the swing frame, and a transmission assembly connected to the drive rod and the second support shaft in between.

In one embodiment, the first drive mechanism and the second drive mechanism are independent of each other.

In one embodiment, the first drive shaft comprises a threaded portion and a smooth portion fixedly connected to the threaded portion, and one end of the smooth portion is far away from the threaded portion. the threaded portion is inserted into the driving rod.

In one embodiment, a second knob is fixedly arranged on the drive rod for driving the drive rod to rotate relative to the bracket.

In one embodiment, the detection mechanism further comprises a support arm arranged on the second support shaft and a conductive probe rotatably arranged on the support arm, a detection area is formed between the conductive probes to determine whether the measured conductor is located in a designated position.

In one embodiment, a first fixing frame is fixedly arranged on the swing frame, and a centering reference line is arranged on the first fixing frame for arranging the conductive probe in the center.

In one embodiment, the second support shaft comprises a first threaded portion and a second threaded portion, and a thread direction of the first threaded portion and a thread direction of the second threaded portion is opposite, the number of the support arms is plural, and a plurality of the support arms are threadedly connected to the second support shaft; when the second support shaft rotates, the support arm located at the first threaded portion and the support arm located at the second threaded portion are close to or far away from each other.

In one embodiment, a compression spring is sleeved on the second support shaft, and one end of the compression spring abuts against the swing frame, the other end of the compression spring abuts on the support arm.

In one embodiment, the detection device further comprises a detection circuit, and the detection circuit is electrically connected to the conductive probe.

In one embodiment, the detection mechanism further comprises a second measuring assembly, the second measuring assembly comprises a second fixing frame fixedly connected to the swing frame and a scale arranged on the second fixing frame and used for measuring the distance between two adjacent conductive probes.

In one embodiment, the transmission assembly comprises a first gear fixedly connected to the peripheral wall of the drive rod and a second gear meshed with the first gear and fixedly connected to the second support shaft.

In one embodiment, the detection device further comprises a drive assembly for driving the swing frame to rotate relative to the bracket, and the drive assembly comprises a connecting shaft, a drive cylinder arranged on the bracket, and a transmission block rotatably arranged on the first support shaft, the connecting shaft is inserted between the transmission block and the mounting slide block, and the transmission block and the mounting slide block are arranged in circumferential linkage.

The present application also provides a wire processing equipment, including a wire processing device and the above-mentioned conductor position detection device that could be biased, and the detection device is used for detecting position of conductors before wire processing.

In one embodiment, wherein the wire processing device is a wire heat shrinking machine.

In one embodiment, the wire processing equipment further comprises a cover fixedly connected to the bracket, and a reference mark is arranged on the cover for measuring an offset of the detection mechanism.

The beneficial effect of the biasing device for detecting a conductor position provided by the present application is that compared with the prior art, the biasing device for detecting a conductor position of the present application is provided with a first drive mechanism on the bracket, and the first drive mechanism includes a the first support shaft rotatably arranged on the bracket and the mounting slide block arranged on the first support shaft, the mounting slide block can move relative to the bracket along the extension direction of the first support shaft when the first support shaft rotates, and the detection mechanism is fixedly connected to the mounting slide on the block, it can be arranged movably relative to the bracket along the extension direction of the first support shaft. It is used to determine whether the measured conductor is located in the detection area of the designated location. By driving the first support shaft to rotate, the mounting slide block is driven relative to the bracket along the extension direction of the first support shaft, and then drive the detection mechanism to adjust to the designated detection area; when the measured conductor is at the designated position, a plurality of conductive probes are in contact with the measured conductor, and a plurality of conductive probes can be electrically connected through the measured conductor, then the detection circuit is turned on; if the measured conductor is not in the designated position, the conductive probe cannot fully contact the measured conductor, and the detection circuit is turned off. Therefore, according to whether the detection circuit is turned on, it can be judged whether the measured conductor is in the designated position; when the cross-sectional area of the exposed conductor of the spliced wire is different, the position of the detection mechanism is reversed in advance to compensate for the offset of the heat shrinkable tube, Thereby ensuring that the heat shrinkable tube is accurately wrapped on the exposed conductor surface at the designated position of the wire in the subsequent process, and the scope of application is increased.

The beneficial effect of the wire processing equipment provided by the present application is that compared with the prior art, the wire processing equipment of the present application is used for wire processing by providing a wire processing device and the above-mentioned conductor position detection device that could be biased. Before detecting the position of the conductor, the biasing device for detecting a conductor position is provided with a first drive mechanism on the bracket. The first drive mechanism includes a first support shaft rotatably arranged on the bracket and a mounting slide block arranged on the first support shaft. The mounting slide block can move relative to the bracket along the extension direction of the first support shaft when the first support shaft rotates, and the detection mechanism is fixedly connected to the mounting slide block, and can be movably arranged relative to the bracket along the extension direction of the first support shaft for judgment Whether the measured conductor is located in the detection area of the designated position, the mounting slide block is driven to move relative to the bracket along the extension direction of the first support shaft by driving the rotation of the first support shaft, and then the detection mechanism is adjusted to the designated detection area; when the measured conductor is in the designated position, If a plurality of conductive probes are in contact with the measured conductor, a plurality of conductive probes can be electrically connected through the measured conductor, and the detection circuit is turned on; if the measured conductor is not in the designated position, the conductive probe cannot all contact the measured conductor, then the detection circuit is disconnected. Therefore, according to whether the detection circuit is turned on, it can be judged whether the measured conductor is in the designated position; when the cross-sectional area of the exposed conductors of the wires to be spliced is different, the position of the detection mechanism is reversed to compensate for the offset of the heat shrinkable tube in advance, thereby ensuring that the heat shrinkable tube is accurately wrapped on the exposed conductor surface at the designated position of the wire in the subsequent process, and the scope of application is increased.

BRIEF DESCRIPTION OF THE DRAWINGS

In order to explain the technical solutions in the embodiments of the present application more clearly, it will briefly introduce the drawings that need to be used in the description of the embodiments or the prior art in the following. Obviously, the drawings in the following description are merely of the present application. For some embodiments, those of ordinary skill in the art can obtain other drawings based on these drawings without creative work.

Figure 1:
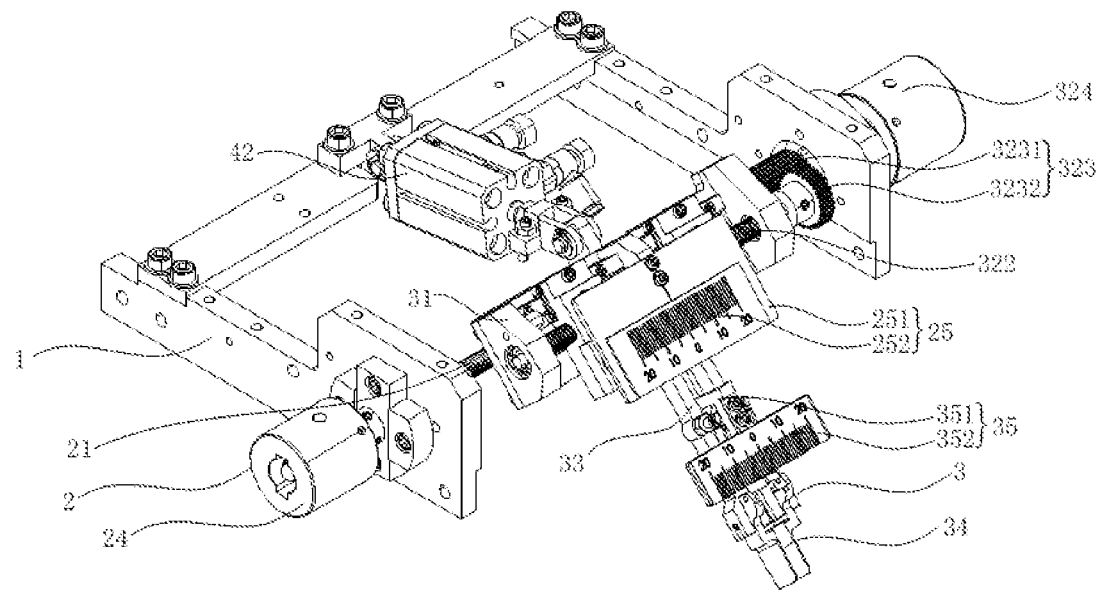
FIG. 1 is a schematic diagram of a three-dimensional structure of a biasing device for detecting a conductor position according to an embodiment of the present application.

The reference signs are used in the figures as following:
1—bracket; 2—first drive mechanism; 21—first support shaft; 211—threaded portion; 212—smooth portion;

22—mounting slide block; 23—support slider; 24—first knob; 25—first measuring assembly; 251—first fixing frame; 252—offset measurement mark; 3—detection mechanism; 31—swing frame; 32—second drive mechanism; 321—drive rod; 322—second support shaft; 323—transmission assembly; 3231—first gear; 3232—second gear; 324—second knob; 33—support arm; 34—conductive probe; 35—second measuring assembly; 351—second fixing frame; 352—scale; 4—drive assembly; 41—connecting shaft; 42—drive cylinder; 43—transmission block.

DETAILED DESCRIPTION

In order to make the technical problems to be solved, technical solutions, and beneficial effects by the present application clearer, the following further describes the present application in detail with reference to the accompanying drawings and embodiments. It should be understood that the specific embodiments described here are only used to explain the present application, but not to limit the present application.

It should be noted that when an element is referred to as being "fixed to" or "arranged on" another element, it can be directly on the other element or indirectly on the other element. When an element is said to be "connected to" another element, it can be directly connected to the other element or indirectly connected to the other element.

It should be understood that the terms "length", "width", "upper", "lower", "front", "rear", "left", "right", "vertical", "horizontal", "top", "bottom", "inner", "outer", etc. indicate the orientation or positional relationship based on the orientation or positional relationship shown in the drawings, only for the convenience of describing the present application and simplifying the description, but not indicating or implying the pointed device or the element must have a specific orientation, be constructed and operated in a specific orientation, and therefore cannot be understood as a limitation of the present application.

In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. In the description of the present application, "a plurality of" means two or more, unless otherwise specifically defined.

Figure 2:
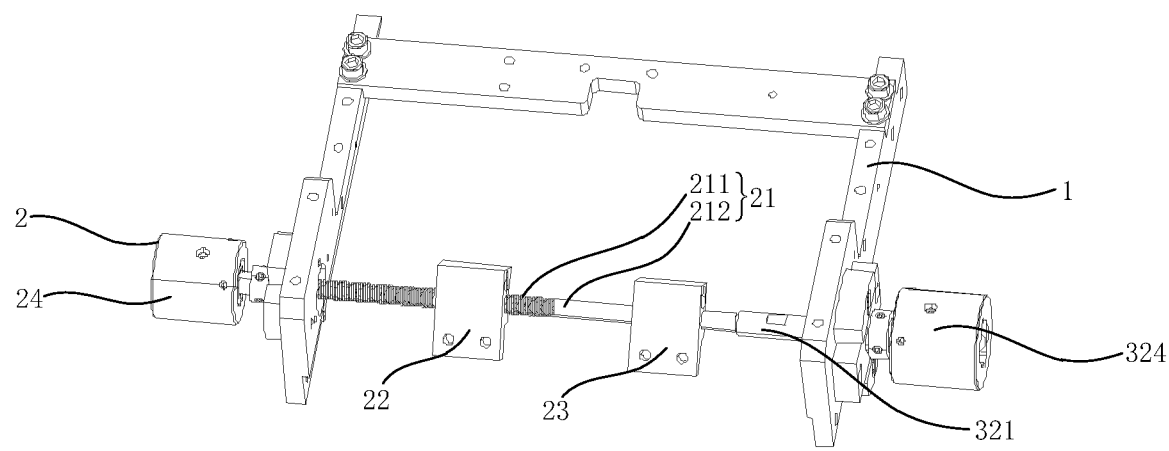
FIG. 2 is a schematic diagram of a three-dimensional structure of a bracket and a first drive mechanism of a biasing device for detecting a conductor position according to an embodiment of the present application.
Figure 3:
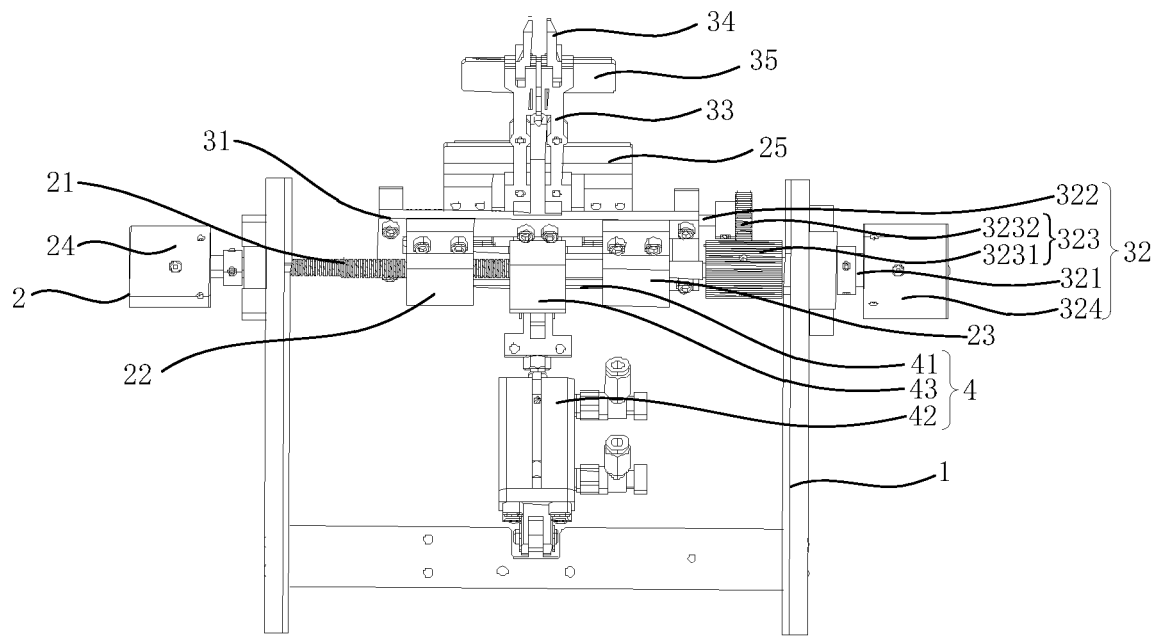
FIG. 3 is a schematic diagram of a bottom view of the structure of a biasing device for detecting a conductor position provided by an embodiment of the present application.

Please refer to FIG. 1-3 together. A biasing device for detecting a conductor position provided by this embodiment includes a bracket 1, a first drive mechanism 2, and a detection mechanism 3. Here the specific structures and connection method of the bracket 1, the first drive mechanism 2, and the detection mechanism 3 are not limited. The first drive mechanism 2 includes a first support shaft 21 rotatably arranged on the bracket 1 and a mounting slide block 22 arranged on the first support shaft 21 and fixedly connected to the detection mechanism 3. The mounting slide block 22 extends along the first support shaft 21 when the first support shaft 21 rotates. It moves relative to the bracket 1, the detection mechanism 3 is fixedly connected to the mounting slide block 22, and is movably arranged relative to the bracket 1 along the extension direction of the first support shaft 21, used to determine whether the measured conductor is located in the detection area of the designated position, optionally, the first support shaft 21 is provided with a first knob 24 fixedly to drive the first support shaft 21 to rotate relative to the bracket 1. The operator drives the first support shaft 21 to rotate by turning the first knob 24, which drives the mounting slide block 22 to move relative to bracket 1 along the extension direction of the first support shaft 21, thereby driving the detection mechanism 3 to be adjusted to a designated detection area; optionally, the detection device also includes a detection circuit, and the detection circuit is electrically connected to the conductive probe 34. When the measured conductor of the wire is located at the designated position, a plurality of conductive probes 34 are in contact with the measured conductor, and a plurality of conductive probes 34 are sufficient. If the measured conductor is electrically connected, the detection circuit is turned on; if the measured conductor is not in the designated position, the conductive probe 34 cannot be fully contacted with the measured conductor, and the detection circuit is turned off. Therefore, according to whether the detection circuit is turned on, it can be judged whether the measured conductor is in the designated position. When the cross-sectional area of the exposed conductor of the spliced wire is different, the position of the detection mechanism 3 is reversed in advance to compensate for the offset of the heat shrinkable tube, thereby ensuring that the heat shrinkable tube is accurately wrapped on the exposed conductor surface at the designated position of the wire in the subsequent process, and the scope of application is increased.

Figure 4:
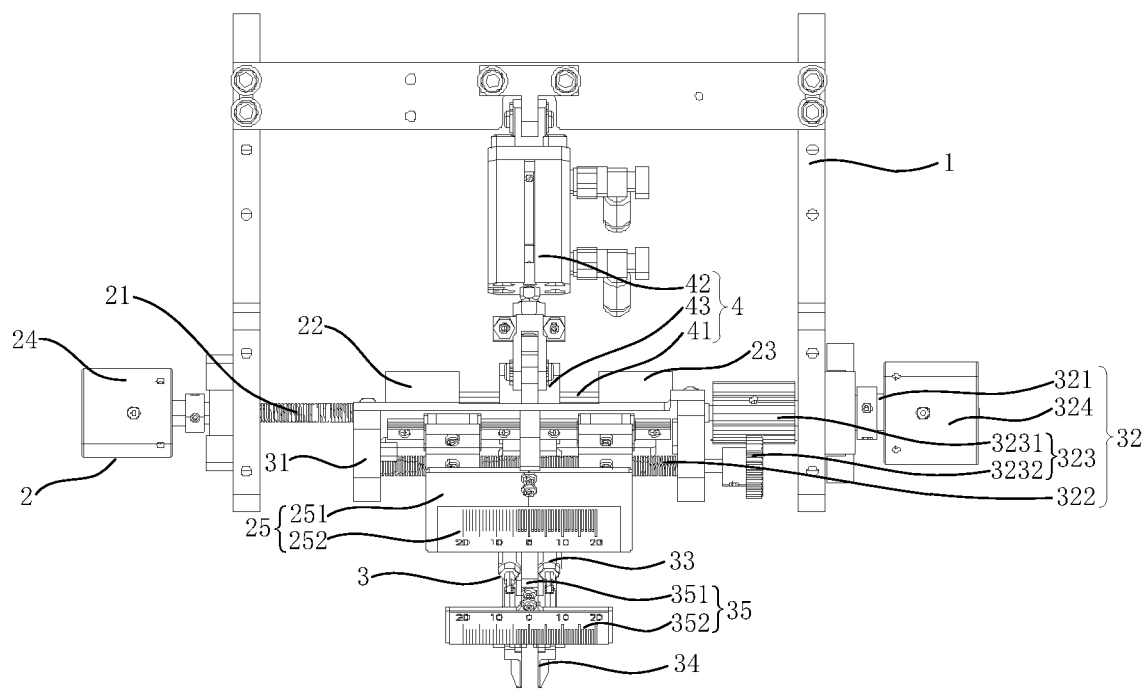
FIG. 4 is a schematic top view of the structure of a biasing device for detecting a conductor position according to an embodiment of the present application.

Refer to FIG. 4, in this embodiment, the detection mechanism 3 also includes a swing frame 31 and a first measuring assembly 25. The first measuring assembly 25 includes a first fixing frame 251 fixedly connected to the swing frame 31 and an offset measurement mark 252 arranged on the first fixing frame 251. The offset measurement mark 252 coordinates with the reference mark fixed on the bracket 1 to measure the offset of the detection mechanism 3. The offset measurement mark 252 is firmly installed at the prearranged position on the swing frame 31 through the first fixing frame 251. When the detection mechanism 3 is shifting, the offset measurement mark 252 on the swing frame 31 has an equivalent offset relative to the reference mark on the bracket 1, which enables accurate measurement of the offset of detection mechanism 3, and further ensures that the heat shrinkable tube can be accurately wrapped on the exposed conductor surface of the wire.

Please refer to FIGS. 2-4 together, in this embodiment, the detection mechanism 3 includes a swing frame 31 and a second drive mechanism 32. The swing frame 31 is fixedly connected to the mounting slide block 22. The detection device includes a drive assembly 4 for driving the swing frame 31 to rotate relative to the bracket 1. The drive assembly 4 drives the detection mechanism 3 to rotate relative to the bracket 1 to swing the conductive probe 34 to the detection area, and moves away from the detection area after the detection is completed, so as to prevent the conductive probe 34 from affecting the next processing operation. The drive assembly 4 includes a connecting shaft 41, a drive cylinder 42 arranged on the bracket 1, and a transmission block 43 rotatably arranged on the first support shaft 21. The connecting shaft 41 penetrates between the transmission block 43 and the mounting slide block 22 and links the transmission block 43 and the mounting slide block 22 in a circumferential direction. The drive cylinder 42 drives the transmission block 43 on the first support shaft 21 to rotate relative to the first support shaft 21. The connecting shaft 41 penetrates between the transmission block 43 and the mounting slide block 22, so that the transmission block 43 and the mounting slide block 22 are arranged in circumferential linkage. The drive cylinder 42 has a telescopic piston rod, the piston rod is telescopically arranged, and the piston rod is rotatably connected to the transmission block 43.

When the piston rod telescopes, the transmission block 43 is pulled to rotate around the first support shaft 21. When the transmission block 43 rotates, the connecting shaft 41 drives the mounting slide block 22 to rotate around the first support shaft 21, and drives the detection mechanism 3 to swing to the detection area. Optionally, the first support shaft 21 is provided with a plurality of mounting slide blocks 22 for installing the detection mechanism 3, and the plurality of mounting slide blocks 22 are respectively arranged on both sides of the transmission block 43, so that the detection mechanism 3 is connected more firmly, and at the same time, during the swing frame 31 is in the swinging process, the medium force is more uniform, which improves the reliability of the detection device.

In one embodiment, whether the detection circuit is turned on can be prompted by a light or sound device, for example, a light or a sound alarm is arranged in the detection circuit. If the detection circuit is turned on, the light will glow or the audible alarm will sound to remind the operator that the detection circuit is turned on. In addition, the electrical signal after the detection circuit is turned on can be used as the condition for the next processing. The detection circuit is turned on and the electrical signal is output. The upper computer controls the next processing equipment to continue working according to the electrical signal; if the detection circuit is not turn on, no electrical signal is output, and the host computer controls the next processing equipment not to work.

Figure 5:
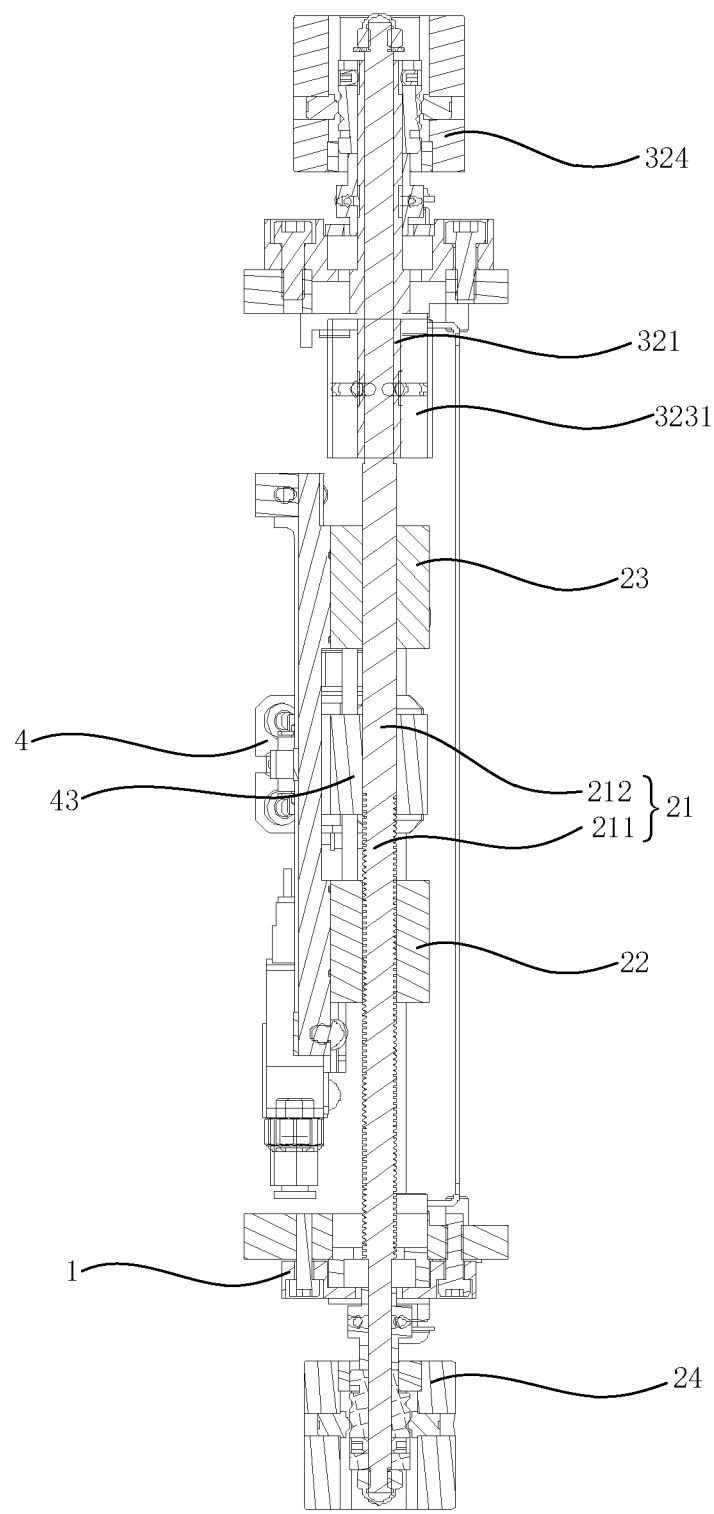
FIG. 5 is a schematic cross-sectional view of the structure of a biasing device for detecting a conductor position according to an embodiment of the present application.

Please refer to FIGS. 3-5 together, as a specific implementation of the biasing device for detecting a conductor position provided in this embodiment, the detection mechanism 3 includes a swing frame 31 and a second drive mechanism 32, and the first drive mechanism 2 and the second drive mechanism 32 are independent of each other The second drive mechanism 32 includes a hollow drive rod 321 sleeved on one end of the first support shaft 21 and rotatably arranged on the bracket 1, a second support shaft 322 rotatably arranged on the swing frame 31, and a transmission assembly 323 connected between the drive rod 321 and the second support shaft 322; the operator drives the transmission assembly 323 to rotate by driving the drive rod 321 to rotate, and then drives the second support shaft 322 to rotate. Optionally, a second knob 324 is fixedly arranged on the drive rod 321 to drive the drive rod 321 to rotate relative to the bracket 1. One end of the drive rod 321 is connected to the first support shaft 21, and the other end is fixedly connected to the second knob 324; optionally, the first support shaft 21 includes a threaded portion 211 and a smooth portion 212 fixedly connected to the threaded portion 211, the end of the smooth portion 212 away from the threaded portion 211 is inserted into the drive rod 321, and the mounting slide block 22 for fixed connection to the detection mechanism 3 is installed on the threaded portion 211. When the support shaft 21 rotates, it can drive the mounting slide block 22 to move relative to the bracket 1 along the extension direction of the first support shaft 21, and then drive the detection mechanism 3 to move to the designated detection area, and put the smooth portion 212 into the hollow drive rod 321 to prevent the first support shaft 21 from driving the drive when the first support shaft 21 rotates. The rotation of the rod 321 affects the detection accuracy, and can reduce the external resistance encountered when the first support shaft 21 rotates, which is convenient for operators to operate. Optionally, the first drive mechanism 2 further includes a support slider 23 for fixedly connecting the swing frame 31. The support slider 23 is slidably arranged on the smooth portion 212, so that the detection mechanism 3 is connected more firmly, and at the same time, the swing frame 31 receives a more uniform force during the swing, which improves the reliability of the commission detection device. Optionally, the transmission assembly 323 includes a first gear 3231 fixedly connected to the outer wall of the drive rod 321 and a second gear 3232 meshed with the first gear 3231 and fixedly connected to the second support shaft 322. The operator drives the second knob 324 to rotate to drive the drive rod 321 to rotate and drive the first gear 3231 and the first gear 3231 rotate and drive the second gear 3232 engaged with them to rotate, thereby driving the second support shaft 322 fixedly connected to the second gear 3232 to rotate, thereby adjusting the gap between the conductive probes 34 and adjusting the length of the detection area.

Please further refer to FIG. 1, FIG. 3 and FIG. 4. In this embodiment, the detection mechanism 3 also includes a support arm 33 arranged on the second support shaft 322 and a conductive probe 34 rotatably arranged on the support arm 33, so that the conductive probe 34 is firmly connected to the second support shaft 322, a detection area is formed between the conductive probes 34 to determine whether the measured conductor is located at a designated position; the support arm 33 is a rod-shaped structure, one end of the support arm 33 is threadedly connected to the second support shaft 322, and the conductive probe 34 is rotatably arranged on the other end; Optionally, a U-shaped frame is arranged at one end of the support arm 33 connected to the conductive probe 34, and a pin shaft for connecting the conductive probe 34 is arranged on the U-shaped frame, so that the conductive probe 34 can rotate around the pin shaft; optionally, the detection mechanism 3 also includes an elastic rearranged member. One end of the elastic rearranged member is connected to the support arm 33, and the other end is connected to the conductive probe 34. The elastic rearranged member is used to keep the conductive probe 34 in the initial position state. When the conductive probe 34 rotates relative to the support arm 33 and leaves the initial position state, the elastic rearranged member is used to rearranged the conductive probe 34; optionally, the elastic rearranged member is a tension spring; when the conductive probe 34 rotates relative to the support arm 33, the elastic rearranged member is elongated to generate elastic force, which can help the conductive probe 34 to rearrange. During the detection process, if the conductive probe 34 exerts too much pressure on the conductor, the conductive probe 34 can move relative to the support arm 33, which not only makes the conductive probe 34 and the conductor closely contact, but also prevents the conductive probe 34 from applying excessive force on the conductor and causing damage. The conductor or conductive probe 34 rearranges the conductive probe 34 through an elastic rearranged member to prevent the conductive probe 34 from moving relative to the support arm 33 from being unable to continue detection. Optionally, a first fixing frame 251 is fixedly arranged on the swing frame 31, and a centering reference line is arranged on the first fixing frame 251, which is used to align the conductive probe 34 to realize the centering adjustment of the position of the conductive probe 34 and improve the accuracy of the position of the conductive probe 34, Which helps to ensure that the heat shrinkable tube can be accurately wrapped on the exposed conductor surface of the wire.

In one embodiment, the second support shaft 322 includes a first threaded portion and a second threaded portion. The thread direction of the first threaded portion is opposite to the thread direction of the second threaded portion. When the second support shaft 322 rotates, the support arm 33 located in the first threaded portion and the support arm 33 located in the second threaded portion can be close to or away from each other, so as to adjust the distance between two adjacent conductive probes 34 and increase the scope of application. Optionally, the detection mechanism 3 also includes a second measuring assembly 35, so that the operator can more intuitively obtain the distance between two adjacent conductive probes 34. The second measuring assembly 35 includes a second fixing frame 351 fixedly connected to the swing frame 31 and a second fixing frame 351 arranged in the second fixing frame. The scale 352 on the frame 351 and used to measure the distance between two adjacent conductive probes 34, the scale 352 is firmly installed in the prearranged position through the second fixing frame 351, so that the distance between two adjacent conductive probes 34 can be accurately measured. To further ensure that the heat shrinkable tube can be accurately wrapped on the exposed conductor surface of the wire. Optionally, a compression spring is sleeved on the second support shaft 322, one end of the compression spring is pressed against the swing frame 31, and the other end is pressed against the support arm 33, which can eliminate the thread gap, keep the position of the support arm 33 stable, and avoid detection shaking during the detection process to avoid affect the detection effect.

The present application also provides a wire processing equipment, including a wire processing device and the above-mentioned conductor position detection device that could be biased, and the detection device is used for detecting the position of the conductor before the wire processing. The biasing device for detecting a conductor position is provided with a first drive mechanism 2 on bracket 1, and the first drive mechanism 2 includes a first support shaft 21 rotatably arranged on the bracket 1 and a mounting slide block 22 arranged on the first support shaft 21. When the support shaft 21 rotates, it moves relative to the bracket 1 along the extension direction of the first support shaft 21, the detection mechanism 3 is fixedly connected to the mounting slide block 22, and is movably arranged relative to the bracket 1 along the extension direction of the first support shaft 21 to determine whether the measured conductor is located at a designated position, the first support shaft 21 rotates to drive the mounting slide block 22 to move relative to the bracket 1 along the extension direction of the first support shaft 21, and then drives the detection mechanism 3 to adjust to the designated detection area; when the measured conductor is at the designated position, a plurality of the conductive probes 34 and the measured conductor are in contact, a plurality of conductive probes 34 can be electrically connected through the measured conductor, and the detection circuit is turned on; if the measured conductor is not in a designated position, the conductive probe 34 cannot all contact the measured conductor, and the detection circuit is turn off. Therefore, according to whether the detection circuit is turned on, it can be judged whether the measured conductor is at the designated position; when the cross-sectional area of the exposed conductor of the spliced wire is different, the position of the detection mechanism 3 is reversed in advance to compensate for the offset of the heat shrinkable tube, Thereby ensuring that the heat shrinkable tube is accurately wrapped on the exposed conductor surface at the designated position of the wire in the subsequent process, and the scope of application is increased. The specific structure of the wire processing device is not limited here. Optionally, the wire processing device is a wire heat shrinking machine; after the detection device determines that the measured conductor is located at the designated position, the conductive probe 34 moves away from the detection area so that the wire processing device can subject the wire to processing operations, the insulating heat shrinkable tube is sleeved on the wire and covered on the surface of the exposed conductor.

In one embodiment, the wire processing equipment further includes a cover fixedly connected to the bracket 1, a reference mark is arranged on the cover, a centering reference line is arranged on the first fixing frame 251 of the swing frame 31, and the reference mark on the cover can be fixed to the centering reference line on the fixing frame 251 is used to measure the offset of the detection mechanism 3; when the detection mechanism 3 is offset, the centering reference line on the first fixing frame 251 will have the same amount of offset relative to the reference mark on the cover to realize accurate measurement of the offset of the detection mechanism 3 to further ensure that the heat shrinkable tube can be accurately wrapped on the exposed conductor surface of the wire.

The above description is only a preferred embodiment of this embodiment, and is not intended to limit this embodiment. Any modification, equivalent replacement and improvement made within the spirit and principle of this embodiment shall be included within the protection scope of the embodiment.

What claimed is:

1. A biasing device for detecting a conductor position, comprising:
   a bracket;
   a first drive mechanism, comprising a first support shaft rotatably arranged on the bracket and a mounting slide block arranged on the first support shaft, wherein the mounting slide block is configured to move relative to the bracket along an extending direction of the first support shaft when the first support shaft rotates; and
   a detection mechanism, wherein the detection mechanism is fixedly connected to the mounting slide block, and is movably arranged relative to the bracket along the extending direction of the first support shaft to determine whether a measured conductor is located in a detection area of a designated position.

2. The biasing device for detecting a conductor position according to claim 1, wherein the first support shaft comprises a threaded portion and a smooth portion fixedly connected to the threaded portion, and the mounting slide block is connected to the threaded portion by threads.

3. The biasing device for detecting a conductor position according to claim 2, wherein the first drive mechanism further comprises a support slider, and the support slider is slidably arranged on the smooth portion.

4. The biasing device for detecting a conductor position according to claim 1, wherein a first knob is fixedly provided on the first support shaft for driving the first support shaft to rotate relative to the bracket.

5. The biasing device for detecting a conductor position according to claim 1, wherein
   the detection mechanism further comprises a swing frame and a first measuring assembly;
   the first measuring assembly comprises: a first fixing frame fixedly connected to the swing frame, and an offset measurement indicator arranged on the first fixing frame; and
   the offset measurement indicator is cooperated with a reference mark fixed on the bracket for measuring an offset of the detection mechanism.

6. The biasing device for detecting a conductor position according to claim 1, wherein the detection mechanism comprises: a swing frame and a second drive mechanism; the swing frame is fixedly connected to the mounting slide block; and the second drive mechanism comprises: a hollow drive rod sleeved on one end of the first support shaft and rotatably arranged on the bracket, a second support shaft rotatably arranged on the swing frame, and a transmission assembly connected between the drive rod and the second support shaft.

7. The biasing device for detecting a conductor position according to claim 6, wherein the first drive mechanism and the second drive mechanism are independent of each other.

8. The biasing device for detecting a conductor position according to claim 6, wherein the first drive shaft comprises a threaded portion and a smooth portion fixedly connected to the threaded portion, and one end of the smooth portion far away from the threaded portion is inserted into the driving rod.

9. The biasing device for detecting a conductor position according to claim 6, wherein a second knob is fixedly arranged on the drive rod for driving the drive rod to rotate relative to the bracket.

10. The biasing device for detecting a conductor position according to claim 6, wherein the detection mechanism further comprises: a support arm arranged on the second support shaft, and a conductive probe rotatably arranged on the support arm; and a detection area is formed between conductive probes to determine whether the measured conductor is located in the designated position.

11. The biasing device for detecting a conductor position according to claim 10, wherein a first fixing frame is fixedly arranged on the swing frame, and a centering reference line is arranged on the first fixing frame for arranging the conductive probe in the center.

12. The biasing device for detecting a conductor position according to claim 10, wherein the second support shaft comprises a first threaded portion and a second threaded portion, and a thread direction of the first threaded portion and a thread direction of the second threaded portion is opposite, the support arm is one of a plurality of support arms, and the plurality of the support arms are threadedly connected to the second support shaft; and when the second support shaft rotates, the support arms located at the first threaded portion and the support arms located at the second threaded portion are close to or far away from each other.

13. The biasing device for detecting a conductor position according to claim 10, wherein a compression spring is sleeved on the second support shaft, and one end of the compression spring abuts against the swing frame, the other end of the compression spring abuts on the support arm.

14. The biasing device for detecting a conductor position according to claim 10, further comprising a detection circuit, wherein the detection circuit is electrically connected to the conductive probe.

15. The biasing device for detecting a conductor position according to claim 10, wherein the detection mechanism further comprises a second measuring assembly, the second measuring assembly comprises: a second fixing frame fixedly connected to the swing frame, and a scale arranged on the second fixing frame and used for measuring a distance between two adjacent conductive probes.

16. The biasing device for detecting a conductor position according to claim 6, wherein the transmission assembly comprises: a first gear fixedly connected to the peripheral wall of the drive rod, and a second gear meshed with the first gear and fixedly connected to the second support shaft.

17. The biasing device for detecting a conductor position according to claim 6, wherein the detection device further comprises a drive assembly for driving the swing frame to rotate relative to the bracket;

the drive assembly comprises: a connecting shaft, a drive cylinder arranged on the bracket, and a transmission block rotatably arranged on the first support shaft; and the connecting shaft is inserted between the transmission block and the mounting slide block, and the transmission block and the mounting slide block are arranged in circumferential linkage.

18. A wire processing equipment, comprising a wire processing device and a biasing device for detecting a conductor position, wherein the biasing device comprises:

a bracket;

a first drive mechanism, comprising a first support shaft rotatably arranged on the bracket and a mounting slide block arranged on the first support shaft, wherein the mounting slide block is configured to move relative to the bracket along an extending direction of the first support shaft when the first support shaft rotates; and a detection mechanism, wherein the detection mechanism is fixedly connected to the mounting slide block, and is movably arranged relative to the bracket along the extending direction of the first support shaft to determine whether a measured conductor is located in a detection area of a designated position, wherein the detection device is used for detecting a position of a conductor before wire processing.

19. The wire processing equipment according to claim 18, wherein the wire processing device is a wire heat shrinking machine.

20. The wire processing equipment according to claim 18, wherein the wire processing equipment further comprises a cover fixedly connected to the bracket, and a reference mark is arranged on the cover for measuring an offset of the detection mechanism.

* * * * *